(12) United States Patent
Livshits (10) Patent No.: US 11,615,243 B1
(45) Date of Patent: Mar. 28, 2023

(54) FUZZY STRING ALIGNMENT

(71) Applicant: iNTUIT iNC., Mountain View, CA (US)

(72) Inventor: Michael Livshits, Mountain View, CA (US)

(73) Assignee: INTUIT INC., Mountain View, CA (US)

( * ) Notice: Subject to any disclaimer, the term of this patent is extended or adjusted under 35 U.S.C. 154(b) by 0 days.

(21) Appl. No.: 17/827,633

(22) Filed: May 27, 2022

(51) Int. Cl.
| | | |
|---|---|---|
| *G06F 16/33* | (2019.01) | |
| *G06F 40/284* | (2020.01) | |
| *G06F 7/20* | (2006.01) | |
| *G06F 17/16* | (2006.01) | |
| *G06F 40/211* | (2020.01) | |

(52) U.S. Cl.
CPC ............. *G06F 40/284* (2020.01); *G06F 7/20* (2013.01); *G06F 17/16* (2013.01); *G06F 40/211* (2020.01)

(58) Field of Classification Search
CPC ............... G06F 16/3338; G06F 16/334; G06F 16/2468; G06F 40/284; G06F 40/232; G06F 16/90344
See application file for complete search history.

(56) References Cited

U.S. PATENT DOCUMENTS

| | | | | |
|---|---|---|---|---|
| 6,636,849 | B1 * | 10/2003 | Tang | G06F 16/2246 |
| | | | | 707/999.005 |
| 9,563,721 | B2 * | 2/2017 | Anderson | G06F 16/3338 |
| 9,953,065 | B2 * | 4/2018 | Gaza | G06F 16/2462 |
| 10,636,083 | B1 * | 4/2020 | Wang | G06Q 40/00 |
| 2004/0141354 | A1 * | 7/2004 | Carnahan | G06F 16/951 |
| | | | | 707/E17.108 |
| 2007/0226362 | A1 * | 9/2007 | Johnson | H04L 47/34 |
| | | | | 709/230 |
| 2008/0275837 | A1 * | 11/2008 | Lambov | G06F 16/90344 |
| | | | | 706/48 |
| 2009/0282039 | A1 * | 11/2009 | Diamond | H04L 9/3066 |
| 2011/0320481 | A1 * | 12/2011 | Huang | G06F 16/3337 |
| | | | | 707/769 |
| 2013/0283156 | A1 * | 10/2013 | Al Badrashiny | G06F 40/232 |
| | | | | 715/257 |
| 2016/0055144 | A1 * | 2/2016 | Huang | G06F 40/232 |
| | | | | 704/9 |

(Continued)

OTHER PUBLICATIONS

Aung, "Comparison of levenshtein distance algorithm and needleman-wunsch distance algorithm for string matching", Jan. 2019, (Doctoral dissertation, MERAL Portal), pp. 1-61.*

(Continued)

*Primary Examiner* — Olujimi A Adesanya
(74) *Attorney, Agent, or Firm* — Ferguson Braswell Fraser Kubasta PC (57) ABSTRACT

A method includes computing multiple term distances between pairs of multiple first string terms in a first string and multiple second string terms in a second string, generating a cost matrix based on the term distances, and selecting a set of candidate alignments based on the cost matrix. The method further includes generating multiple alignment scores for the set of candidate alignments, and selecting, from the set of candidate alignments, an alignment between the first string and the second string based on the alignment scores. The method further includes outputting a match identifier based on the alignment.

20 Claims, 8 Drawing Sheets

(56) References Cited

U.S. PATENT DOCUMENTS

2016/0335244 A1* 11/2016 Weisman .............. G06F 40/242
2018/0247016 A1*  8/2018 Semenyuk ............. G16B 30/00
2019/0325211 A1* 10/2019 Ordonez ............. G06V 30/414

OTHER PUBLICATIONS

"Damerau-Levenshtein Distance", Wikipedia.com, updated last on Oct. 17, 2021, 6 pages.
"Levenshtein Distance", Wikipedia.com, updated last on Apr. 14, 2022, 7 pages.
"Needleman-Wunsch Algorithm", Wikipedia.com, updated last on Apr. 7, 2022, 11 pages.

* cited by examiner

|  | Heathcare | Medical | Firm |
|---|---|---|---|
| Health | 0.83 | 0.0 | 0.0 |
| and | 0.0 | 0.87 | 0.0 |
| Medicine | 0.0 | 0.0 | 0.0 |
| Law | 0.0 | 0.0 | 0.0 |
| Firm | 0.0 | 0.0 | 1.0 |
| LLC | 0.0 | 0.0 | 0.0 |

600 Term Distances Matrix

*FIG. 6*

|  |  | Healthcare | Medical | Firm |
|---|---|---|---|---|
|  | 0 | 1 | 2 | 3 |
| Health | 1 | 0 | 1 | 2 |
| and | 2 | 1 | 2 | 3 |
| Medicine | 3 | 2 | 1 | 2 |
| Law | 4 | 3 | 2 | 3 |
| Firm | 5 | 4 | 3 | 2 |
| LLC | 6 | 5 | 4 | 3 |

700 Cost Matrix

*FIG. 7*

|  | Health | and | Medicine | Law | Firm | LLC |
|---|---|---|---|---|---|---|
|  | Healthcare | - | Medical | - | Firm | - |
| Distance | 0.83 | 0.0 | 0.87 | 0.0 | 1.0 | 0.0 |
| Weight | 0.98 | 0.89 | 0.98 | 0.96 | 0.99 | 0.0 |

800 Chart of Alignment with Alignment Score Generation

FUZZY STRING ALIGNMENT

BACKGROUND

Since the advent of networked computing systems, enormous volumes of data have been created. Because of the amount of the data, computing systems are also relied upon to analyze such data and present results. In data analytics, the answer that should be outputted is not in the realm of standard logic in which the decision process is true or false, but rather in the realm of fuzzy logic in which the decision process is based on degree of truth. Because computing systems use binary values naturally operate on standard logic and because computing system have limited resources, a computing system applying fuzzy logic with accuracy and efficiency is a challenge.

For example, matching between a pair of two strings is not a trivial problem. General rule based approaches do not consider the semantics of the strings that the algorithms are comparing and do not care for the "signal" that each word carries with it to the meaning of a string.

SUMMARY

In general, in one aspect, one or more embodiments relate to a method including computing multiple term distances between pairs of multiple first string terms in a first string and multiple second string terms in a second string, generating a cost matrix based on the term distances, and selecting a set of candidate alignments based on the cost matrix. The method further includes generating multiple alignment scores for the set of candidate alignments, and selecting, from the set of candidate alignments, an alignment between the first string and the second string based on the alignment scores. The method further includes outputting a match identifier based on the alignment.

In general, in one aspect, one or more embodiments relate to a system including memory and a computer processor. The computer processor is configured to execute a term distance generator configured to compute multiple term distances between pairs of multiple first string terms in a first string and multiple second string terms in a second string. The computer processor is further configured to execute a cost matrix generator configured to generate a cost matrix based on the term distances. A set of candidate alignments is selected based on the cost matrix. The computer processor is further configured to execute an alignment scoring model configured to generate multiple alignment scores for the set of candidate alignments. The computer processor is further configured to execute an alignment selector configured to select, from the set of candidate alignments, an alignment between the first string and the second string based on the alignment scores, and output a match identifier based on the alignment.

In general, in one aspect, one or more embodiments relate to a method including obtaining a first string from a first repository and a second string from a second repository, tokenizing the first string into multiple first string terms and a second string into the second string terms, obtaining a first term of the first string terms and a second term of the second string terms, selecting a first character of the first term and a second character of the second term, assigning a character score based on a comparison of the first character and the second character. The character score is dependent on whether the first character and the second character are one selected from a group consisting of vowels, keyboard adjacent, and the same. The method further includes computing, based on the character score, multiple term distances between pairs of the first string terms in the first string and the second string terms in the second string, generating a cost matrix based on the term distances, selecting a set of candidate alignments based on the cost matrix, generating multiple alignment scores for the set of candidate alignments, and selecting, from the set of candidate alignments, an alignment between the first string and the second string based on the alignment scores. The method further includes outputting a match identifier based on the alignment.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention are directed to fuzzy string alignment. Fuzzy string alignment is the process of aligning the terms of two strings so that terms that are the closest match to each other are in the same position in the two strings. For example, fuzzy string alignment may be used as part of a matching process to determine whether the two strings refer to the same subject matter. By way of a more specific example, fuzzy string alignment may be used, for example, to compare two strings from different repositories to determine whether the two strings refer to the same business entity. The string alignment is fuzzy in that the terms may not match directly, may be in different orders, and may have terms missing or changed between the strings.

In one or more embodiments, fuzzy string alignment is performed on a first string and a second string by obtaining terms from the two strings, such as by using a tokenization processing. The computing system computes term distances between each pair of terms having a term in the first string and a term in the second string. Term distances may be used to determine whether the pair of terms match each other. Based on the term distances the computing system generates a cost matrix. The cost matrix is matrix of costs for aligning two terms in a sequence based on insertion, deletion and whether the terms are deemed to match. From the cost matrix, the computing system determines a candidate set of string alignments. The candidate set of string alignments are alignments for the complete strings and based on whether the terms should align according to the cost matrix. The set of candidate alignments are scored in order to select an alignment between the first string and the second string. A match identifier identifying whether match or no match exists between the two strings may be outputted.

One or more embodiments further relate to a pluggable framework whereby the pluggable framework is predefined. Further, the code that the computing system uses to compute the term distances, the code to compute the cost matrix, and the code to generate the alignment may be selected at the time of configuring the predefined framework. Thus, different algorithms, as defined by the code, may be used depending on the type of strings, the level of accuracy, and the resource usage requirements of the overall system.

Figure 1:
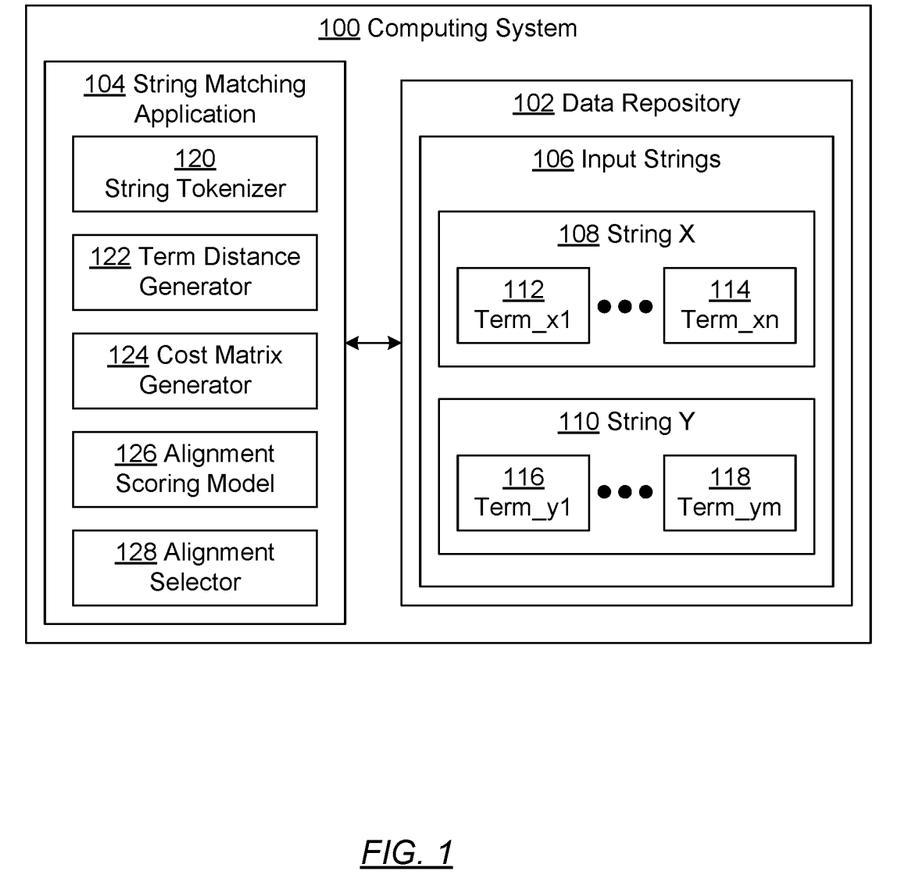
FIG. 1 shows a diagram of a system in accordance with one or more embodiments.

Turning to FIG. 1, FIG. 1 shows a diagram of a computing system (100) in accordance with one or more embodiments. The computing system (100) may be the system described below with reference to FIG. 9A and FIG. 9B. As shown in FIG. 1, the computing system (100) includes a data repository (102) connected to a string matching application (104). Both of these components are described below.

In one or more embodiments, the data repository (102) is any type of storage unit and/or device (e.g., a file system, database, collection of tables, or any other storage mechanism) for storing data. Further, the data repository (102) may include multiple different storage units and/or devices. The multiple different storage units and/or devices may or may not be of the same type or located at the same physical site.

The data repository (102) includes functionality to store input strings (106) The input strings (106) are the target for the string matching. In the example, the input strings (106) include string X (108) and string Y (110). Each string (e.g., string X (108), string Y (110)) is an ordered sequence of terms (e.g., term_x1 (112), term_xn (114), term_y1 (116), term_ym (118)). Each term may be an individual word, a symbol, or a sequence of symbols or alphanumeric characters. Terms may also be referred to as a term, n-gram, word, or other Terms may be separated, for example, by a spacing character or characters of different types. Strings being compared may have the same or different lengths. For example, the number of terms in a pair of matching strings may differ from each other. Similarly, terms in the matching strings may be in different orders, may be in a different form, and may have slightly different meanings.

Each string may be from a different repository. For example, string X (108) may be from the records of a first user stored in a first storage location and string Y (110) may be from the records of a second user stored in a second storage location. Although two strings are shown for simplifying the description, one or more embodiments are applied to pairwise string alignment on large volumes of data. Further, the string alignments may be performed as a backend process, such as part of a data migration or cleanup process, or on demand, such as when a user submits a new string, and a determination is to be made whether the subject matter of the string already exists in the system.

The data repository (102) is operatively connected to a string matching application (104). The string matching application (104) is a software tool configured to generate an alignment between two strings. The string matching application (104) includes a string tokenizer (120), a term distance generator (122), a cost matrix generator (124), an alignment scoring model (126), and an alignment selector (128). The string tokenizer (120), term distance generator (122), cost matrix generator (124), alignment scoring model (126), and alignment selector (128) each correspond to software code that implements one or more algorithms. In one or more embodiments, the string matching application (104) is a pluggable framework that is configured to connect to external code for one or more of the string tokenizer (120), term distance generator (122), cost matrix generator (124), alignment scoring model (126), and alignment selector (128).

The string tokenizer (120) is software code that implements an algorithm for partitioning a string into tokens. The string tokenizer (120) is configured to iterate through the characters in the string to identify term boundaries. Term boundaries may include spacing characters (i.e., a character for a space, tab, or other character that adds space), punctuation marks, and other characters.

The term distance generator (122) is configured to generate term distances between pairs of terms and populate a term distance matrix. A "matrix" as used herein does not denote any particular underlying storage structure. Any data storage mechanism that relates two objects with a value. In some cases, such as with the term distance matrix, the ordering objects in the matrix is optionally maintained by the underlying data structure. In other cases, such as in relation to the cost matrix, position within the matrix is maintained by the underlying data structure.

Figure 2:
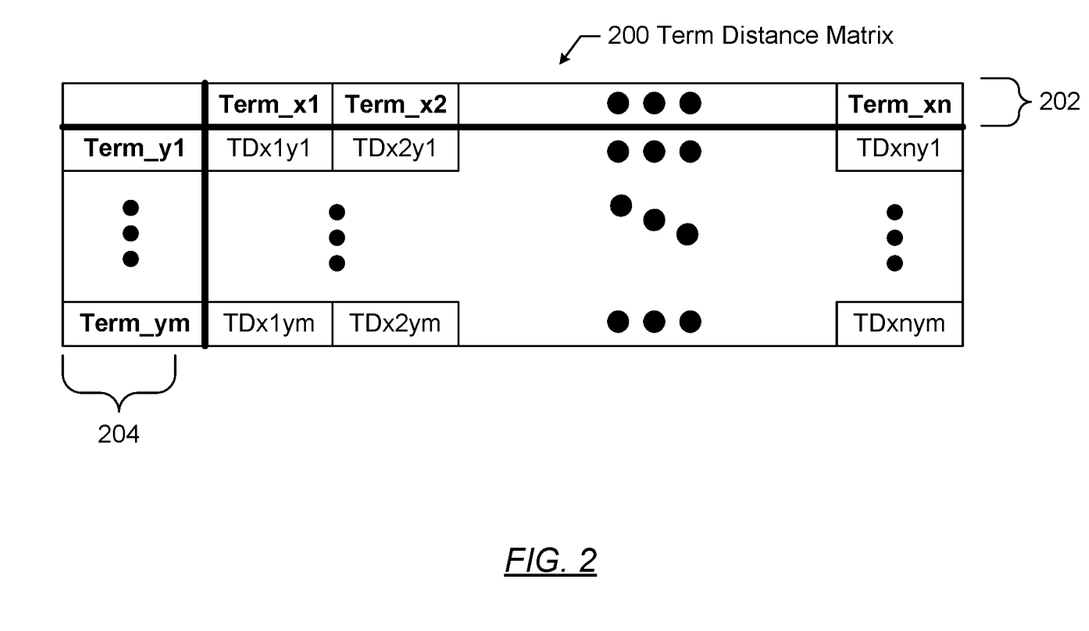
FIG. 2 shows a diagram of a term distance matrix in accordance with one or more embodiments.

FIG. 2 shows a schematic diagram of a term distance matrix (200). In the example of FIG. 2, a first axis (202) has individual columns for each term of a first string and the second axis (204) has individual rows for each term of the second string. The intersection of each row and column is the term distance between the term represented by the row and the term in the column. In FIG. 2, the term distance is represented by TDxiyj, where i and j refer to a particular column and row. The term distance refers to the degree to which a pair of terms match. Term distances may be an edit distance that considers letters, similarity between definitions, degree of match of individual letters, or based on satisfying another matching criterion. Thus, the term distance may be an indicator whether a particular term in the first string may be substituted for a particular term in a second string. The term distance matrix (200) may be a symmetric matrix when the algorithm to compute term distance is commutative. In another scenario, a first term may be capable of being substituted for a second term, but the second term may not be capable of being substituted for the first term.

Returning to FIG. 1, the term distance generator (122) may be configured to apply threshold criterion and threshold value to the term distance. Threshold criterion is based on whether the term distance generator (122) performs the calculation as to the term distance. For example, a threshold criterion may be whether the initial set of symbols, such as the first three letters, of the terms match. Threshold value is a threshold on the term distance to determine whether to change the term distance to indicate no match. For example, if the term distance is a value between 0 and 1, where 1 indicates match and 0 indicates no match, then the threshold value may be set at 0.75. Thus, any computed term distance that is less than 0.75 is reset to 0 to indicate no match. In another scenario, the threshold value may be that any term distance above the threshold value is set to 1 to indicate a positive match.

Figure 3:
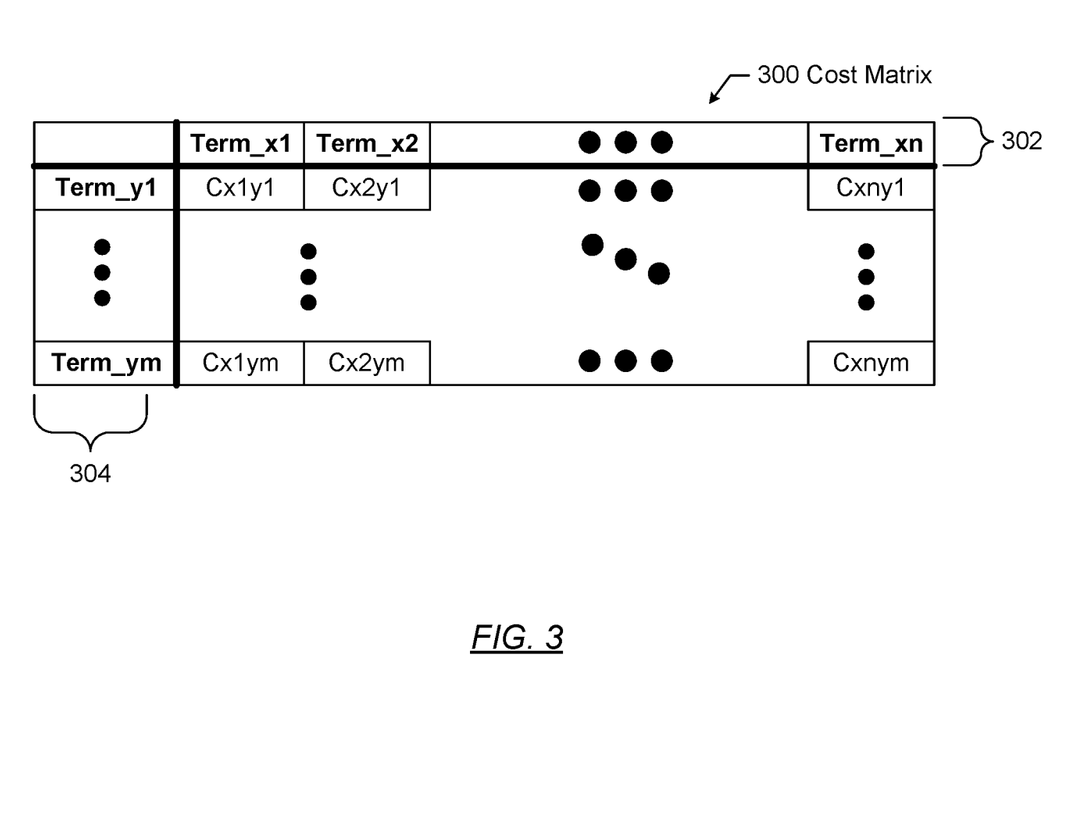
FIG. 3 shows a diagram of a cost matrix in accordance with one or more embodiments.

Continuing with FIG. 1, the cost matrix generator (124) is configured to generate a cost matrix. A cost matrix is described in reference to FIG. 3. FIG. 3 shows a schematic diagram of a cost matrix (300). In the example of FIG. 3, a first axis (302) has individual columns for each term of a first string and the second axis (304) has individual rows for each term of the second string. The intersection of each row and column is the cost of alignment between the term represented by the row and the term in the column. In FIG. 3, the cost is represented by Cxiyj, where i and j refer to a particular column and row. The cost is a value placed on inserting, moving, or deleting entire terms so that the term represented by the row and the term represented by the column are aligned. In computing the cost matrix, an insertion is deemed to have a first cost amount, a gap is deemed to have a second cost amount, and a deletion has a third cost amount. The sum of the costs for the two terms to align is the cost of aligning the two terms. The cost matrix generator is configurable in that increasing the costs of insertion and deletion more than the gap costs gives a preference to different alignment than increasing the costs of gap over insertion and deletion.

Returning to FIG. 1, the cost matrix generator (124) may be configured to implement different algorithms to calculate the cost matrix. For example, the cost matrix generator (124) may implement Needleman Wunsch algorithm, classic Levenshtein algorithm, Damerau-Levenshtein algorithm, Optimal String Alignment (OSA) algorithms Levenshtein calculates the minimum number of insertions, deletions, and symbol substitutions for a particular alignment of terms of a first string with the terms of a second string. Damarau Levenshtein adds to Levenshtein by allowing for transposition between terms of a string to form an alignment. OSA is similar to Levenshtein, but prevents multiple transformations (insertions, transpositions, deletions) on the same substring. Needleman Wunsch is an algorithm for generating an alignment between deoxyribonucleic acid (DNA) sequences and is described in reference to FIG. 4 for applying to the string alignment. Regardless of the algorithm used, the cost matrix generator (124) generates the cost matrix that represents costs of aligning pairs of terms from different strings.

The alignment scoring model (126) is configured to identify a set of candidate alignments and generate an alignment score for the candidate alignments. For example, the alignment scoring model (126) may implement the various algorithms to generate the set of candidate alignments. The candidate alignments are generated as a minimization problem on the cost matrix. For example, the minimization is to find the minimal cost path of moving from the top left corner of the cost matrix (e.g., first term or initial space of each string) with the first term to the bottom right corner of the cost matrix (e.g., last term or last space of each string). Multiple such minimal cost paths may exist. Each minimal cost pass corresponds to an individual candidate alignment.

The alignment scoring model (126) is further configured to generate an alignment score for the candidate alignments. The alignment score is a function of the term distances between pairs of terms that are aligned and the weight of each term. The weight may be inverse document frequency (IDF) weight in the term-frequency IDF algorithm Thus, a term that has many instances in a set of strings that are being compared may have a lower weight. In another embodiment, the weight function may be a function of semantic distance. Terms may be transformed into vector representations of semantic meaning, and the difference between the vector representations is the semantic distance that may be used to calculate the weight.

The alignment selector (128) is configured to select an alignment from the set of candidate alignments based on the alignment score. The alignment selector (128) may further be configured to determine whether a match exists between the first string and the second string based on the alignment score and output a match identifier. The match identifier may indicate match or no match. The match identifier may further or alternatively identify the degree of the match. For example, the match identifier may include the alignment score.

While FIG. 1-3 show a configuration of components, other configurations may be used without departing from the scope of the invention. For example, various components may be combined to create a single component. As another example, the functionality performed by a single component may be performed by two or more components.

Figure 4:
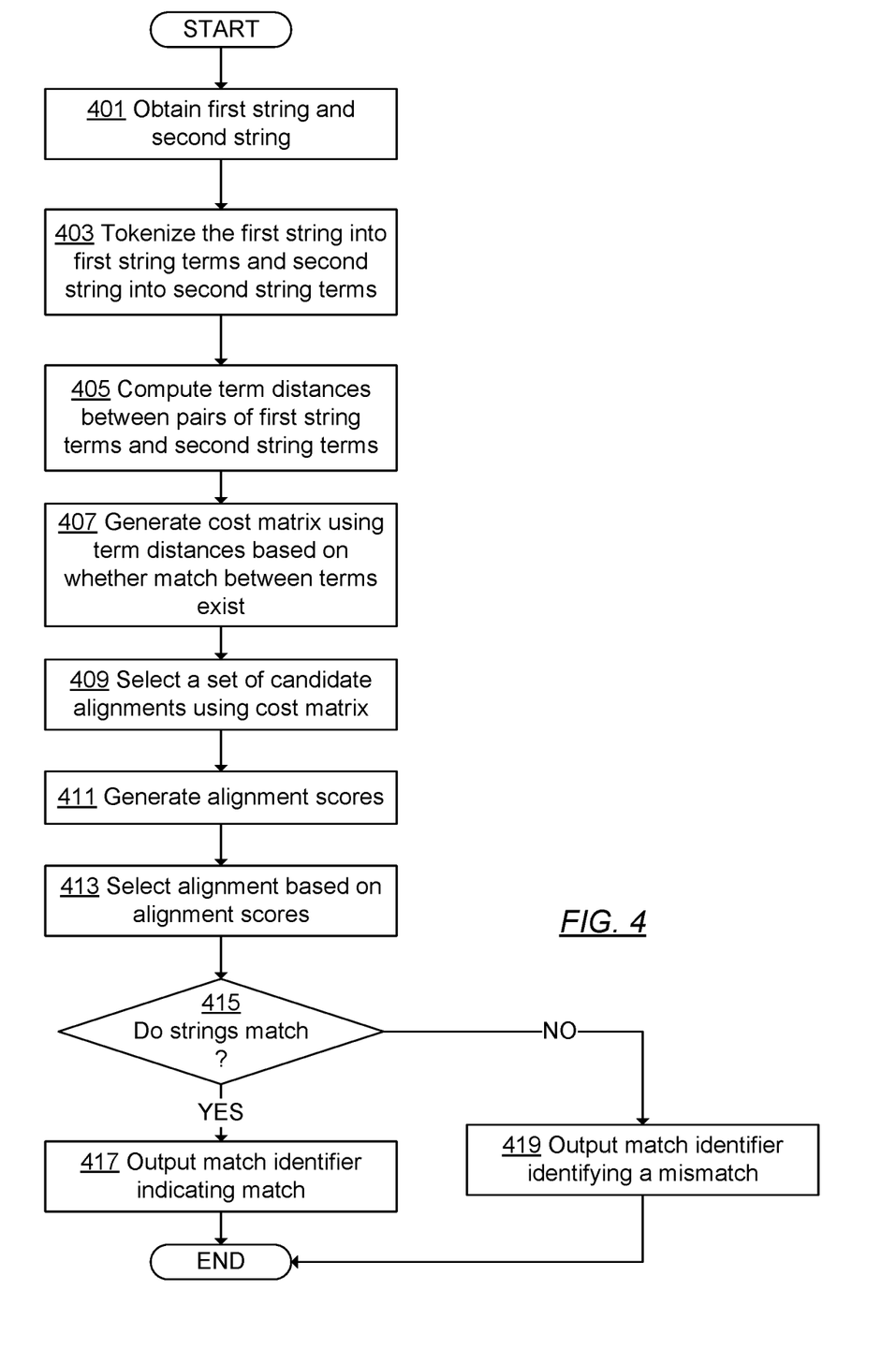
FIG. 4 shows a flowchart for string term alignment in accordance with one or more embodiments.
Figure 5:
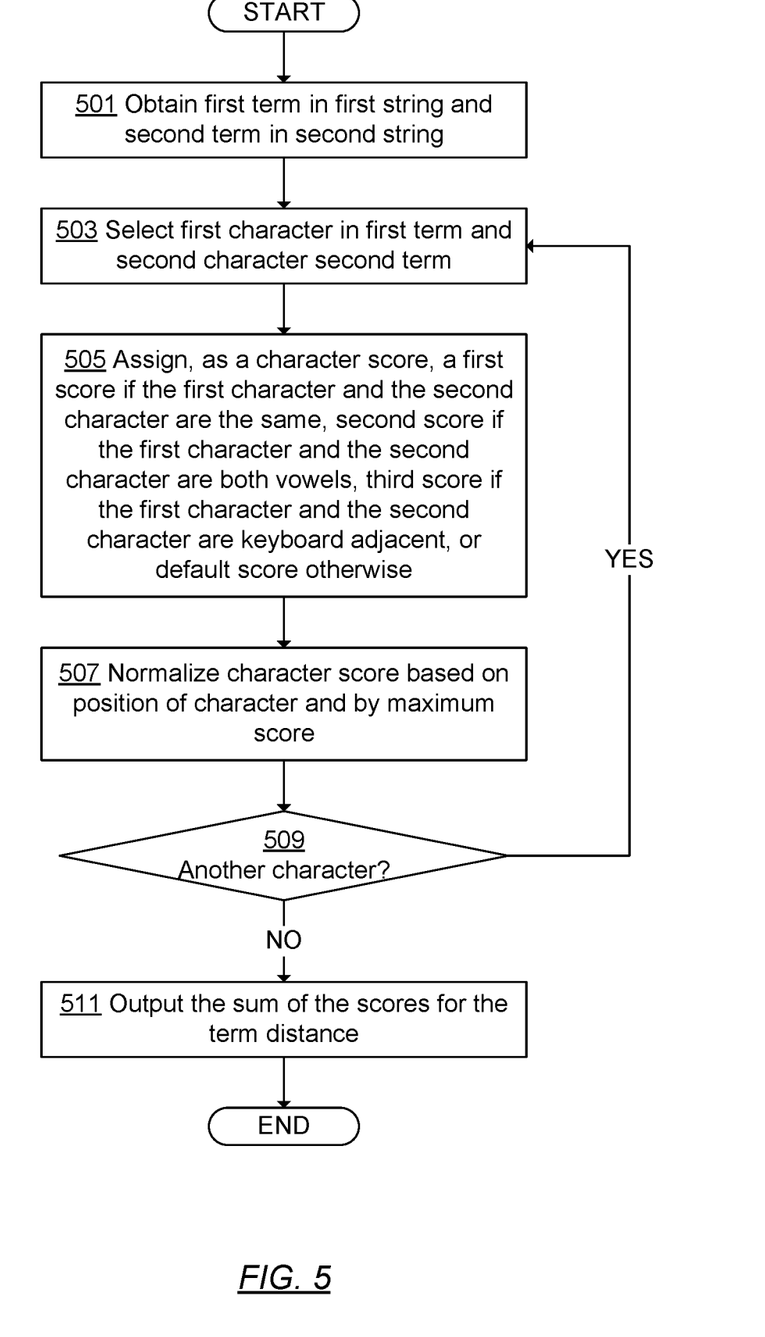
FIG. 5 shows a flowchart for computing term distances in accordance with one or more embodiments.

FIG. 4 and FIG. 5 show flowcharts. FIG. 4 shows a flowchart for determining an alignment between two strings. FIG. 5 shows an example of calculating term distances in one or more embodiments. While the various steps in these flowcharts are presented and described sequentially, one of ordinary skill will appreciate that some or all of the steps may be executed in different orders, may be combined or omitted, and some or all of the steps may be executed in parallel.

Turning to FIG. 4, in Block 401, a first string and a second string are obtained. In general, the process of FIG. 4 is performed for multiple pairs of strings. A system may iterate through different pairs to obtain different alignments. In some cases, the system has a particular string that is to be compared against other strings in a repository. For example, if the user or an external system submits a string via an interface, the system may be triggered to determine whether the submitted string matches any of the existing strings in a repository in order to prevent duplication or to obtain a record. As another example, in the case of database consolidation, the system may iterate through strings in different repositories or the same repository to identify whether the entities represented by different strings are the same.

In Block 403, the first string is tokenized into first string terms and second string is tokenized into second string terms. The tokenization process iterates through the characters of each string individually to identify term boundaries between terms. For example, a substring of alphabetic characters may be separated from characters of a different type. As another example, spacing between characters may be indicative of a term boundary. The respective strings are thus divided into sequences of terms (i.e., first string terms for the first string and second string terms for the second string), where each term is demarcated from other terms and has a particular position within the sequence. In some embodiments, the tokenization process removes stop terms.

In Block 405, term distances between pairs of first string terms and second string terms are computed. The string matching application iterates through pairs of terms having a first string term in the first string and a second string term in the second string. With each pair, the string matching application executes a term distance generator to obtain a term distance between the terms in the pair and populates the term distance matrix. In some embodiments, the system is a pluggable framework. In such a scenario, the system issues a call to an external term distance generator with the terms in the pair.

As discussed above, different techniques may be used to calculate term distance. One technique is to only allow direct matches. If the terms are the same, or a normalized version of the terms are the same, the term distance is 0 otherwise the term distance is 1. Another technique is to determine edit distance as the term distance. Edit distance is the number of changes (e.g., character insertions, character deletions, character swaps) to transform a first string term in a pair of terms to a second string term of the pair of terms. Another technique determines definitional distances between pairs of terms. For example, the terms may be compared to a term graph that organizes terms based on definitions of the words. Terms that are synonyms, such as "desk" and "work surface" may be close to each other in the graph while a bit more distance exists between related terms, such as "king" and "queen". Unrelated terms, such as "bird" and "car", may be far from each other in the graph. The graphical distance between the terms in the pair of terms is the term distance for the pair. Another measure of term distance is semantic distance. Semantic distance considers the distance between the terms in a large target corpus. Terms that appear close together in the corpus have a lower semantic distance, while terms that do not frequently appear close together have a higher semantic distance. Other measures of term distance may be used. Another method of calculating term distance is described in FIG. 5 (described below after FIG. 4 description).

Continuing with FIG. 4, in Block 407, a cost matrix is generated using term distances based on whether a match between terms exist. Different techniques may be used to generate a cost matrix. For example, the techniques include classic Levenshtein, Damerau-Levenshtein, and OSA. OSA does not care about order of terms to create OSA alignment, but rather identifies which in the first term matches best with a term in the second string.

Another technique is Needlemann Wunsch. In Needleman Wunsch, a match between terms is assigned a first score, a mismatch between terms is assigned a second score and an insertion/deletion of a gap is assigned a third score. A match exists if the term distances between the pairs of terms as represented by the distance matrix is greater than a threshold. Three candidate scores are generated as follows.

In the cost matrix, the algorithm moves through the cells (i.e., each intersection of row and column) row by row, calculating the score for each target cell of the cost matrix. The target cell score is calculated by comparing the cell scores of the cells adjacent to the left, top or top-left (diagonal) of the cell and adding the appropriate score for match, mismatch or indel. Calculate the candidate scores for each of the three possibilities: The path from the top or left cell represents an indel pairing, so take the two cell scores of the left and the top cell and add the score for insertion deletion to each of two cell scores individually to form two candidate scores for the target cell. The diagonal path represents a match/mismatch, so take the cell score of the top-left diagonal cell and add the score for match if the corresponding terms in the row and column are matching or the score for mismatch if terms do not match as the third candidate score for the target cell. The resulting cell score for the target cell is the highest of the three candidate scores. The process repeats until the cost matrix is populated.

In Block 409, a set of candidate alignments are selected using the cost matrix. The set of candidate alignments are selected by using a minimization function on the cost matrix. The cost matrix is traversed from top left corner to bottom right corner to identify a path through the cost matrix that has the minimum cost. The path can only have forward edges (e.g., from left to right, from top to bottom or from diagonal left/top to right/bottom). The path having a horizontal forward edge from left to right corresponds to a gap in a first string. The path having a vertical forward edge corresponds to a gap in the second string. The path moving diagonal corresponds to a match of two terms. Multiple paths through the cost matrix that each have minimal value may exist.

In Block 411, alignment scores are generated. A separate alignment score is calculated for each alignment. For each term, the alignment score accounts for the term distance and a weight of each term. In one or more embodiments, the weight is the IDF in TF-IDF. If have a term that has a lot of instances in a lot of records (e.g., of the repositories), the term gets a lower score. For financial records, LLC is a popular word, so LLC would get a low weight. For example, the weight for the pair of terms may be calculated as 1 minus maximum IDF value for the two terms that are aligned. The weights may be normalized by dividing the weight by the sum of the weights. In another method, the weight can also consider word embeddings or use semantic distance. The alignment score may be calculated as the sum over all pairs of terms in the alignment of the term distance multiplied by normalized weight for the pair.

In Block 413, an alignment is selected based on the alignment scores. The alignment is selected that has the optimal score. For example, the alignment with the maximal value for the alignment score amongst the set of candidate alignments may be selected.

In Block 415, a determination is made whether the strings match. In one or more embodiments, the strings match if the alignment score of the selected alignment is greater than a threshold. If the selected alignment score is not greater than a threshold, then the strings do not match. In Block 417, if the strings match, a match identifier indicating that the strings match is outputted. The match identifier may also include the alignment and the alignment score. In Block 419, if the strings do not match, a match identifier indicating mismatch is outputted. The match identifier indicating mismatch may optionally include the selected alignment and the alignment score.

In some embodiments, the system stops with Block 413 and the selected alignment is outputted. In other embodiments, the match identifier is outputted.

FIG. 5 shows a flowchart for calculating term distances in accordance with one or more embodiments. In Block 501, a first term of the first string terms and a second term of the second string terms is obtained. The system iterates through pairs of terms. In Block 503, a first character of the first term and a second character of the second term are selected. In one or more embodiments, characters are selected in an order of the characters in the terms. Thus, the initial positioned character in the first term is compared against the initial positioned character in the second string. Likewise, the subsequent character after the initial positioned character (i.e., second positioned character) of the two terms are compared. Thus, pairwise comparisons are performed between characters in the terms according to the position.

In Block 505, the character score is assigned based on a comparison of the first character and the second character. In some embodiments, the initial subset of characters (e.g., initial two or three characters) must match exactly or term distance generator returns with a null value indicating no match. In other words, a null score is assigned as the score of the terms when a first initial subset of characters in a first term of the first string fails to match a second initial subset of characters in a second term of the second string without comparing remaining subsets of characters of first string and the second string.

If the initial set match, then the following operations may be performed for remaining character comparisons. A first score is assigned as the character score when the first character and the second character are the same; a second score is assigned as the character score when the first character and the second character are both vowels; a third score is assigned when the first character and the second character are keyboard adjacent; and a default score is assigned if the above conditions are now satisfied. For example, the first score may be 1.0, the second score may be 0.6, the third score may be 0.3, and the default score may be 0 in an example in which 1 is the closest match and 0 is no match.

In Block 507, the character score is normalized based on the position (i.e., index) of the character and the maximum score. Normalizing the character score by its index puts a heavy emphasis on the beginning characters of each word, thus reduces the need for stemming One way to normalize the score by position is to multiply the score by $(1/(1+i))$, where i is the position of the character. Further, the character score is normalized by a maximum score to make the score summable to at most 1. In the example, the character score may be divided by the maximum character score.

In Block 509, a determination is made whether another character exists. The term distance generator moves to the next character position in the terms. If another character exists in both terms or in either term in other embodiments, the process repeats with Block 503 for the next character.

In Block 511, the sum of the scores is outputted for the term distance. The character score across the characters of the first term and the characters of the second term are summed to obtain a term distance for the first term and the second term. The summation is outputted. In some embodiments, the inverse of the sum is outputted depending on whether the output is a cost or a score.

Figure 6:
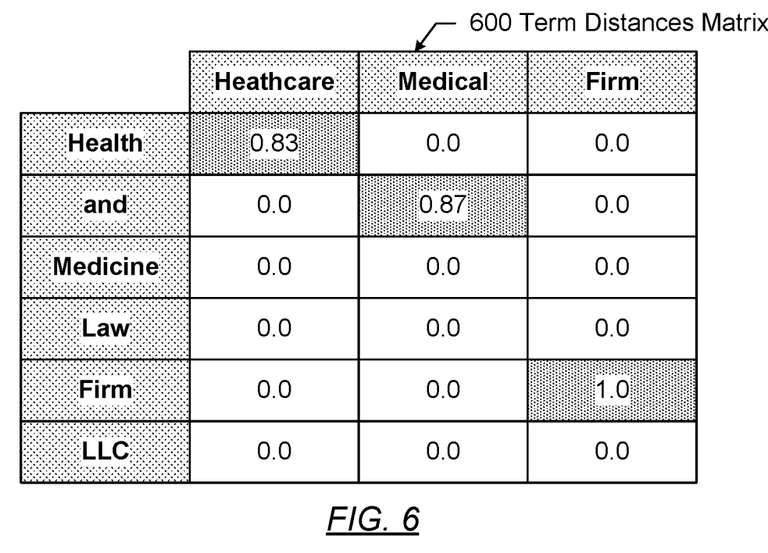
FIG. 6 shows an example of a term distance matrix in accordance with one or more embodiments.
Figure 7:
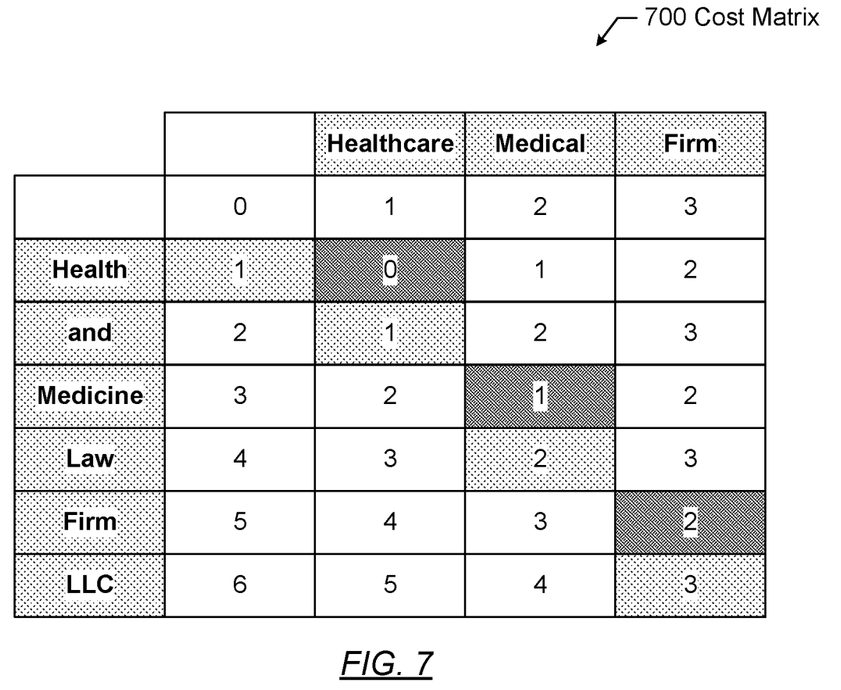
FIG. 7 shows an example of a cost matrix in accordance with one or more embodiments.
Figure 8:
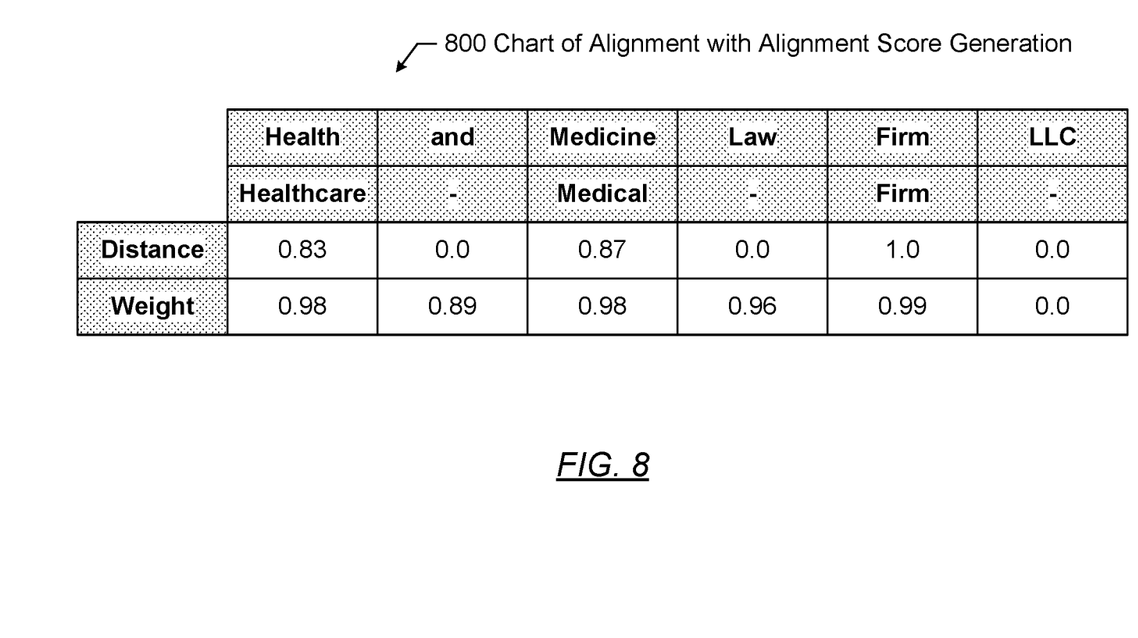
FIG. 8 shows an example of generating and scoring an alignment in accordance with one or more embodiments.

FIG. 6-8 shows an example in accordance with one or more embodiments. The example is for explanatory purposes only and not intended to limit the scope of the invention. FIG. 6 is an example of a term distance matrix (600) in accordance with one or more embodiments. In FIG. 6, the first string is "healthcare medical firm" and the second string is "health and medical law firm LLC" as shown on the axes of the term distance matrix. Each cell in the term distance matrix (600) has the term distance for the first string term column of the cell and the second string term at the row corresponding to the cell. If the term distance does not satisfy a threshold, then the term distance is set at zero or a null value. As shown, "firm" in both strings match exactly and have a term distance of 1. "Medical" and "medicine" have a 0.87 term distance and "health" and "healthcare" have a 0.83 term distance.

FIG. 7 shows an example of a cost matrix (700) for the same strings as shown in FIG. 6. The cost matrix in FIG. 7 is generated using standard Levenshtein. Iterating through the cost matrix produces a candidate alignment whereby Health and Healthcare are aligned, Medical and Medicine are aligned, and firm and firm are aligned. The resulting alignment is shown in the first two rows of the chart of FIG. 8. FIG. 8 shows an example chart (800) of alignment with an alignment score. The first two rows of the chart are the alignment of the first string and second string, whereby a dash indicates a gap. The third row is the term distance row that has the term distances from the term distance matrix. The fourth row is the weight, which is the 1 minus the maximum IDF value of the two terms in the example. The weights are normalized by computing each weight divided by the sum of all weights. The normalized weight is multiplied by the corresponding term distance to produce a weighted distance. The sum of the weighted distance is the alignment score of 0.55

Figure 9A:
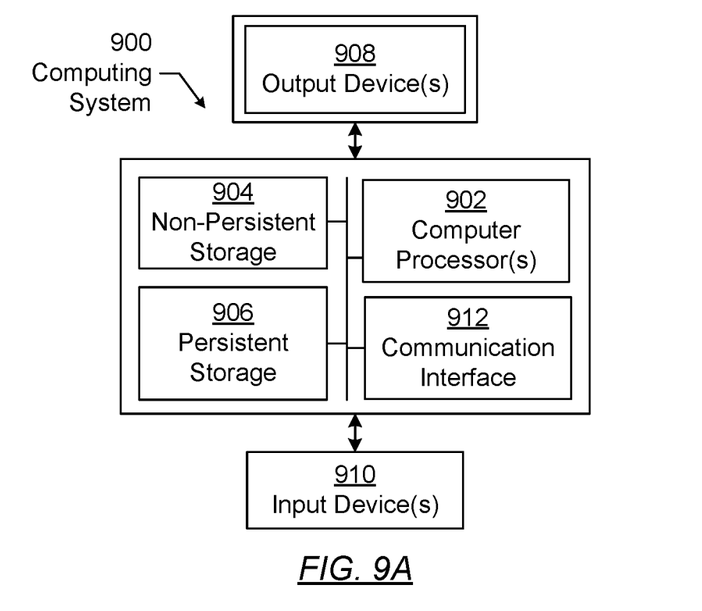
FIGS. 9A and 9B show a computing system in accordance with one or more embodiments of the invention.

Embodiments of the invention may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 9A, the computing system (900) may include one or more computer processors (902), non-persistent storage (904) (e.g., volatile memory, such as random access memory (RAM), cache memory), persistent storage (906) (e.g., a hard disk, an optical drive such as a compact disk (CD) drive or digital versatile disk (DVD) drive, a flash memory, etc.), a communication interface (912) (e.g., Bluetooth interface, infrared interface, network interface, optical interface, etc.), and numerous other elements and functionalities that implement the features and elements of the disclosure.

The computer processor(s) (902) may be an integrated circuit for processing instructions. For example, the computer processor(s) may be one or more cores or micro-cores of a processor. The computing system (900) may also include one or more input devices (910), such as a touchscreen, keyboard, mouse, microphone, touchpad, electronic pen, or any other type of input device.

The communication interface (912) may include an integrated circuit for connecting the computing system (900) to a network (not shown) (e.g., a local area network (LAN), a wide area network (WAN) such as the Internet, mobile network, or any other type of network) and/or to another device, such as another computing device.

Further, the computing system (900) may include one or more output devices (908), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (902), non-persistent storage (904), and persistent storage (906). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

Figure 9B:
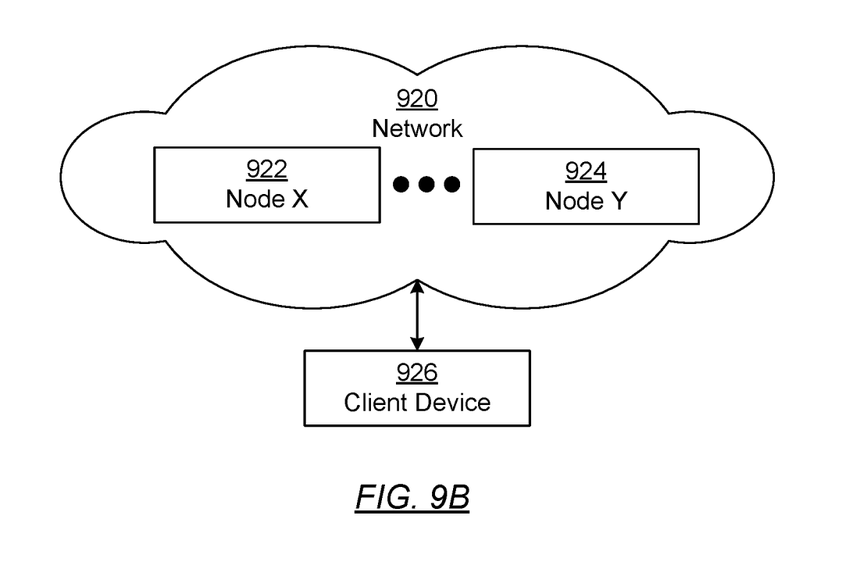

The computing system (900) in FIG. 9A may be connected to or be a part of a network. For example, as shown in FIG. 9B, the network (920) may include multiple nodes (e.g., node X (922), node Y (924)). Each node may correspond to a computing system, such as the computing system shown in FIG. 9A, or a group of nodes combined may correspond to the computing system shown in FIG. 9A.

By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (900) may be located at a remote location and connected to the other elements over a network.

Although not shown in FIG. 9B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (922), node Y (924)) in the network (920) may be configured to provide services for a client device (926). For example, the nodes may be part of a cloud computing system. The nodes may include functionality to receive requests from the client device (926) and transmit responses to the client device (926). The client device (926) may be a computing system, such as the computing system shown in FIG. 9A. Further, the client device (926) may include and/or perform all or a portion of one or more embodiments of the invention.

The computing system or group of computing systems described in FIGS. 9A and 9B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system in FIG. 9A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 9A, while performing one or more embodiments of the invention, may perform data comparison. Data comparison may be used to compare two or more data values (e.g., A, B). For example, one or more embodiments may determine whether $A>B$, $A=B$, $A \neq B$, $A<B$, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if $A>B$, B may be subtracted from A (i.e., $A-B$), and the status flags may be read to determine if the result is positive (i.e., if $A>B$, then $A-B>0$). In one or more embodiments, B may be considered a threshold, and A is deemed to satisfy the threshold if $A=B$ or if $A>B$, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 9A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, data containers (database, table, record, column, view, etc.), identifiers, conditions (comparison operators), functions (e.g., join, full join, count, average, etc.), sorts (e.g., ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 9A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system of FIG. 9A and the nodes and/or client device in FIG. 9B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method comprising:
    obtaining, by a computer processor, a first string;
    obtaining, by the computer processor and from a physical storage repository, a second string;
    computing, by the computer processor, a plurality of term distances between pairs of a plurality of first string terms in the first string and a plurality of second string terms in the second string, wherein computing the plurality of term distances comprises:
        obtaining a first term of the plurality of first string terms and a second term of the plurality of second string terms,
        selecting a first character of the first term and a second character of the second term, and
        assigning a character score based on a comparison of the first character and the second character, wherein assigning the character score comprises performing at least one selected from a group consisting of:
            assigning a first score when the first character and the second character are the same,
            assigning a second score when the first character and the second character are both vowels,
            assigning a third score when the first character and the second character are keyboard adjacent, and
            assigning a default score;
    generating, by the computer processor using a software application implementing a distance algorithm, a cost matrix based on the plurality of term distances;
    selecting, by the computer processor, a set of candidate alignments based on the cost matrix;
    generating, by the computer processor, a plurality of alignment scores for the set of candidate alignments;
    selecting, by the computer processor and from the set of candidate alignments, an alignment between the first string and the second string based on the plurality of alignment scores;
    generating, by the computer processor, a match identifier based on the alignment, the match identifier indicating whether the first string matches the second string; and
    accessing, by the computer processor, the physical storage repository according to the match identifier.

2. The method of claim 1, further comprising:
    obtaining the first string from a first repository and the second string from a second repository; and
    tokenizing the first string into the plurality of first string terms and the second string into the plurality of second string terms.

3. The method of claim 1, further comprising:
    determining whether a first term in the plurality of first string terms matches a second term in the plurality of second string terms based on a term distance of the plurality of term distances that corresponds to the first term and the second term.

4. The method of claim 1, further comprising:
    normalizing the character score.

5. The method of claim 1, further comprising:
    summing the character score across a plurality of characters of the first term and the plurality of characters of the second term to obtain a term distance for the first term and the second term.

6. The method of claim 1, further comprising:
    assigning a null score to when a first initial subset of characters in a first term of the first string fails to match a second initial subset of characters in a second term of the second string without comparing remaining subsets of characters of the first string and the second string.

7. The method of claim 1, wherein generating the cost matrix is performed using Needleman Wunsch algorithm.

8. The method of claim 1, wherein selecting the set of candidate alignments using the cost matrix comprises:
    traversing the cost matrix to identify a path with minimum cost.

9. The method of claim 1, wherein selecting, from the set of candidate alignments, the alignment between the first string and the second string based on the plurality of alignment scores comprises:
    comparing an alignment score of a candidate alignment having a maximal value amongst the set of candidate alignments to a threshold, and
    returning the candidate alignment as the alignment when the threshold is satisfied.

10. The method of claim 1, wherein the match identifier indicates a mismatch when each of the plurality of alignment scores of the set of candidate alignments fail to satisfy a threshold.

11. The method of claim 1, wherein accessing the physical storage repository comprises:
    obtaining, from the physical storage repository, a record linked to the second string based on the match identifier indicating that the first string and the second string match.

12. The method of claim 1, wherein accessing the physical storage repository comprises:
    preventing duplication in the physical storage repository of a record linked to the second string based on the match identifier indicating that the first string and the second string match.

13. A computing system comprising:
    a physical storage repository storing at least one of a first string and a second string; and
    a computer processor configured to execute:
        a term distance generator configured to compute a plurality of term distances between pairs of a plurality of first string terms in the first string and a plurality of second string terms in the second string, wherein computing the plurality of term distances comprises:
            obtaining a first term of the plurality of first string terms and a second term of the plurality of second string terms,
            selecting a first character of the first term and a second character of the second term, and
            assigning a character score based on a comparison of the first character and the second character, wherein assigning the character score comprises performing at least one selected from a group consisting of:
    assigning a first score when the first character and the second character are the same,
    assigning a second score when the first character and the second character are both vowels,
    assigning a third score when the first character and the second character are keyboard adjacent, and
    assigning a default score, using a software application implementing a distance algorithm,
a cost matrix generator configured to generate a cost matrix based on the plurality of term distances, wherein a set of candidate alignments is selected based on the cost matrix,
an alignment scoring model configured to generate a plurality of alignment scores for the set of candidate alignments,
an alignment selector configured to:
    select, from the set of candidate alignments, an alignment between the first string and the second string based on the plurality of alignment scores, and
    generate a match identifier based on the alignment, the match identifier indicating whether the first string matches the second string, and
wherein the computing system accesses the physical storage repository according to the match identifier.

14. The computing system of claim 13, wherein the computer processor is further configured to execute:
a string tokenizer configured to:
    obtain the first string from a first repository and the second string from a second repository; and
    tokenize the first string into the plurality of first string terms and the second string into the plurality of second string terms.

15. The computing system of claim 13, wherein the computer processor is configured to:
determine whether a first term in the plurality of first string terms matches a second term in the plurality of second string terms based on a term distance of the plurality of term distances that corresponds to the first term and the second term.

16. A method comprising:
obtaining, by a computer processor, a first string from a first repository and a second string from a second repository;
tokenizing, by the computer processor, the first string into a plurality of first string terms and the second string into a plurality of second string terms;
obtaining, by the computer processor, a first term of the plurality of first string terms and a second term of the plurality of second string terms;
selecting, by the computer processor, a first character of the first term and a second character of the second term;
assigning, by the computer processor, a character score based on a comparison of the first character and the second character, wherein assigning the character score comprises performing at least one selected from a group consisting of:
    assigning a first score when the first character and the second character are the same,
    assigning a second score when the first character and the second character are both vowels,
    assigning a third score when the first character and the second character are keyboard adjacent, and
    assigning a default score;
computing, by the computer processor and based on the character score, a plurality of term distances between pairs of the plurality of first string terms in the first string and the plurality of second string terms in the second string;
generating, by the computer processor using a software application implementing a distance algorithm, a cost matrix based on the plurality of term distances;
selecting, by the computer processor, a set of candidate alignments based on the cost matrix;
generating, by the computer processor, a plurality of alignment scores for the set of candidate alignments;
selecting, by the computer processor and from the set of candidate alignments, an alignment between the first string and the second string based on the plurality of alignment scores;
generating, by the computer processor, a match identifier based on the alignment, the match identifier indicating whether the first string matches the second string; and
accessing, by the computer processor, the second repository according to the match identifier.

17. The method of claim 16, further comprising:
summing the character score across a plurality of characters of the first term and the plurality of characters of the second term to obtain a term distance for the first term and the second term.

18. The method of claim 16, further comprising:
determining whether a first term in the plurality of first string terms matches a second term in the plurality of second string terms based on a term distance of the plurality of term distances that corresponds to the first term and the second term.

19. The method of claim 16, wherein accessing the second repository comprises:
obtaining, from the second repository, a record linked to the second string based on the match identifier indicating that the first string and the second string match.

20. The method of claim 16, wherein accessing the second repository comprises:
preventing duplication in the second repository of a record linked to the second string based on the match identifier indicating that the first string and the second string match.

* * * * *